INVENTOR
DOUGLAS W. TAYLOR
BY Mueller Aichele and Rauner
ATTORNEYS

INVENTOR
DOUGLAS W. TAYLOR
BY Mueller Aichele and Rauner
ATTORNEYS

United States Patent Office 3,427,498
Patented Feb. 11, 1969

3,427,498

VERTICAL DEFLECTION SYSTEM FOR TELEVISION

Douglas W. Taylor, Phoenix, Ariz., assignor to Motorola, Inc., Franklin Park, Ill., a corporation of Illinois
Filed Oct. 24, 1965, Ser. No. 504,839
U.S. Cl. 315—27 7 Claims
Int. Cl. H01j *29/70*

ABSTRACT OF THE DISCLOSURE

A TV deflection system for achieving a predetermined scan and including a magnetic deflection yoke connected in parallel with a yoke analog circuit. The yoke analog circuit has series resistance and capacitance components therein having a time constant equal to the time constant of the deflection yoke. Comparing means are coupled to the resistance component of the yoke analog circuit for deriving an error signal, and this error signal is applied via amplifier circuitry to the deflecting yoke to compensate for nonlinearities in the current ramp in the deflection yoke. In addition, novel clamping circuitry is connected to the amplifying circuitry to clamp the maximum voltage induced in the deflection yoke during retrace.

The present invention relates generally to vertical deflection systems used in TV circuits and more particularly to an improved vertical deflection system which compensates for voltage changes in the deflection yoke in order to maintain a substantially linear current ramp in the inductive component of the yoke during active scan.

A large number of deflection systems presently in use employ various wave shaping techniques in order to obtain a deflection wave having a desired sawtooth portion for active scan and a retrace portion for gating the yoke in and out of active scan. Included in these systems is one in which the output voltage of an oscillator is shaped into a voltage sawtooth and a superimposed pulse component is added to achieve retrace. This modified sawtooth is then amplified and applied to the deflection yoke, and nonlinearities in the amplifier and associated coupling networks are corrected by the use of feedback around the output stage. Either blocking oscillator or multivibrator circuits may be used to drive a deflection system of this type.

Another conventional vertical deflection system in use today generates a predistorted sawtooth waveform to compensate for the known non-linearities in the deflection system output components, and this system includes amplifier and associated yoke coupling networks as mentioned above, but no feedback correction circuit.

A major disadvantage of using the above described conventional vertical deflection systems is that an accurate linearity control is always required to compensate for circuit component tolerances, amplifier active device aging or replacement and certain required adjustments of scan amplitude for any of a number of reasons. The scan size control and linearity control are not independent variables, and a certain degree of skill is involved in the control of these factors in order to achieve good results.

In addition, the driving oscillator in these prior art systems must be carefully designed to prevent size or linearity changes in the deflection signal with adjustments of the oscillator hold control, and the output active device and output transformer must also meet certain stringent linearity specifications. Furthermore, circuit efficiency must often be compromised in order to insure adequate linearity in the deflection voltage.

Many of the conventional deflection systems of the type mentioned above require a thermistor in the yoke circuit to compensate for undesirable changes in the yoke current, and this thermistor usually represents a significant power loss.

The vertical deflection system according to the present invention has been designed to overcome or entirely eliminate the above described disadvantages characteristic of the above mentioned systems, particularly with regard to improved scan linearity.

Accordingly, it is an object of the present invention to provide a new and improved vertical deflection system for TV circuits.

It is another object of the invention to provide a deflection system operable to achieve a substantially linear scan in a cathode ray tube without meeting the usual stringent requirements for linearity control of active and passive deflection circuit components.

Another object of the invention is to provide a deflection system of the type described having an improved scan size and linearity control and which requires a minimum number of standard electronic components.

A feature of the present invention is the provision of a novel yoke analog circuit connected to a deflection yoke for producing an analog or control voltage which varies in proportion to the yoke voltage and which may be used to compensate for certain non-linear current changes in the deflection yoke.

Another feature of the invention is the provision of a novel error voltage producing circuit for sensing the analog or control voltage of the analog circuit, and comparing it to a reference voltage for producing an error voltage which is coupled to the yoke in such a manner that it will tend to maintain a linear current ramp in the deflection yoke.

Another feature of the invention is the provision of an oscillator circuit for gating the deflection yoke in and out of the retrace portion of the cycle while being completely disconnected from the deflection system during the active scan interval.

Still another feature of the invention is the provision of a transistorized gating and clamping network for initially causing a sharp reduction in current flow in the yoke to allow the yoke to retrace and thereafter for clamping the yoke at a predetermined maximum retrace voltage.

These and other objects and features of the invention will become more readily apparent in the following description of the annexed drawings wherein.

Briefly described, the invention includes a magnetic deflection yoke having a winding which has an effective resistance therein. A voltage source is connected to the yoke for producing a current ramp in the yoke. A yoke analog circuit including series connected resistance and capacitance components is connected in parallel with the deflection yoke, and the resistance-capacitance time constant of the yoke analog circuit is equal to the resistance-inductance time constant of the yoke. Therefore, the voltage across the inductance component of the yoke will equal the voltage across the resistive component of the yoke analog circuit.

The voltage across the resistive component of the yoke analog circuit is continuously compared to a reference voltage and the result of such comparison is an error voltage which varies in accordance with the variation in voltage across the inductive component of the yoke. This error voltage is used to correct the yoke current in a direction required to maintain a substantially linear current ramp through the yoke and to maintain a substantially constant voltage across the inductive component of the yoke. Additional waveform modification circuitry may also be incorporated to establish a desired corrective shape to the yoke current for scannnig a wide angle cathode ray tube.

Figure 1:
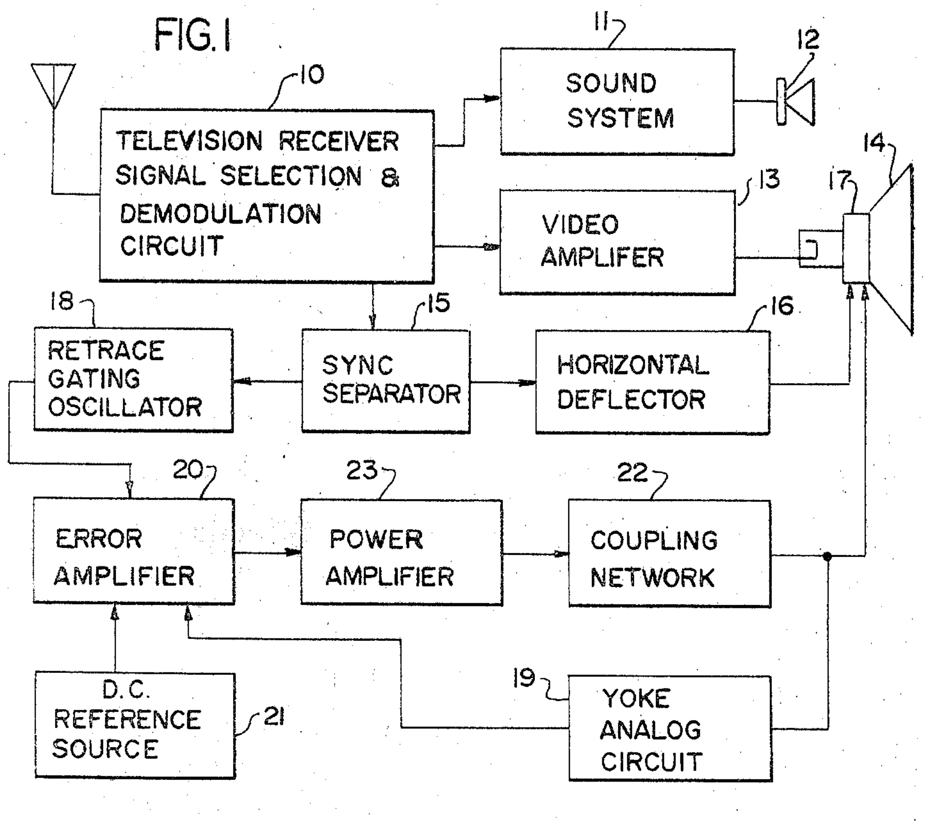
FIG. 1 is a block diagram representation of a television receiver incorporating the yoke analog vertical deflection system of the invention.

Referring now to FIG. 1 of the drawings, there is shown a television receiver including receiver signal selection and demodulation circuitry 10 which is coupled to a sound system 11 that derives the audio portion of a received television signal to be reproduced by the loudspeaker 12. Circuitry 10 is also coupled to a video amplifier 13 which drives a cathode ray picture tube 14. The television circuit 10 is further connected to the synchronizing signal separator circuit 15 which is coupled to a horizontal deflection circuit 16 that provides a current for the deflection yoke 17 to cause horizontal scanning of the beam in the cathode ray tube 14. Synchronizing signal separator circuit 15 is coupled to the retrace gating oscillator 18 in order to synchronize this oscillator with the synchronizing pulses of the received television circuit, which occur at 60 cycles per second for the vertical beam deflection system of the receiver.

A yoke analog circuit 19 is connected between the vertical deflection winding of yoke 17 and an error amplifier 20 for providing a signal at the error amplifier which, when compared to a reference voltage from D.C. source 21, may be applied to the vertical winding of yoke 17 in such a manner as to maintain the voltage across the inductive component thereof constant.

The retrace gating oscillator 18 is also connected to the error amplifier 20 and periodically applied a gating signal which disconnects the yoke 17 from the error amplifier 20 and allows the yoke to retrace. The coupling circuit 22 which connects the output of the power amplifier circuitry 23 to the input of the yoke 17 also serves as a voltage clamp to establish a maximum value of retrace voltage across the yoke 17 and the yoke analog circuit 19. The retrace gating circuit 18 is used only to gate the yoke 17 in and out of active scan and it is completely disconnected from the yoke during the active scan period.

Figure 2:
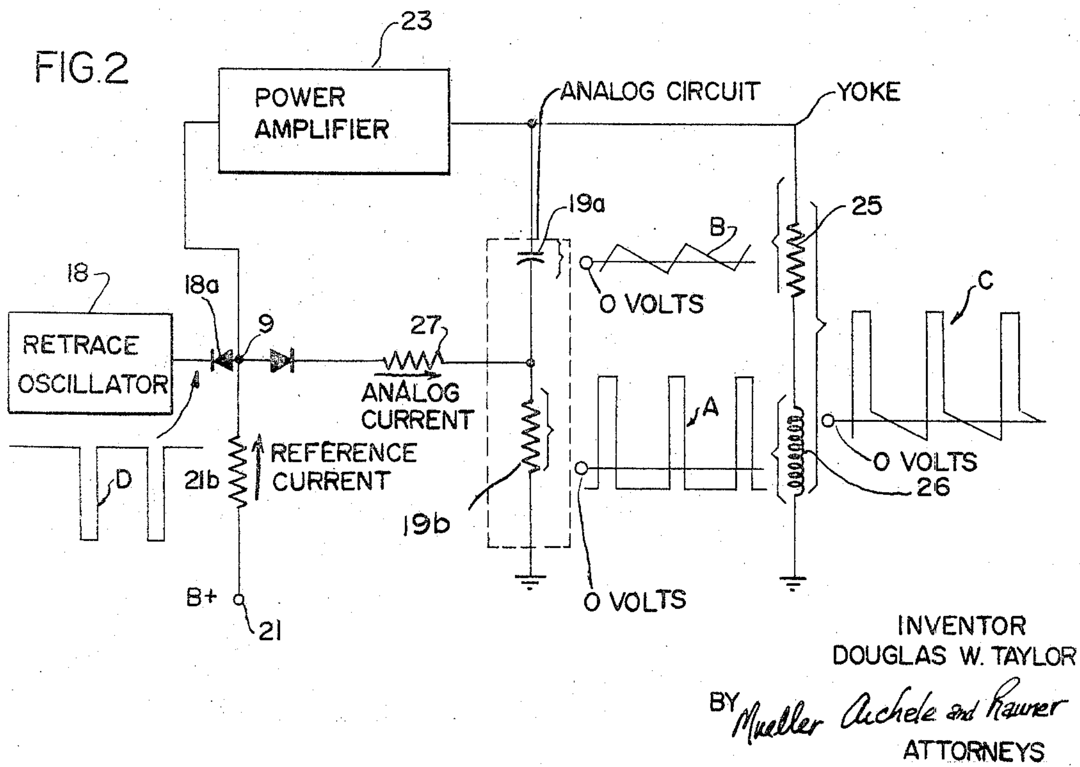
FIG. 2 illustrates a schematic diagram of one embodiment of the yoke analog deflection system of the invention.

Referring to FIG. 2 there is shown the vertical winding of a deflection yoke consisting of series connected resistance and inductance components 25 and 26 and a yoke analog circuit including capacitor **19*a* and analog resistor 19*b*. The yoke analog circuit is connected via resistor 27 and diode 28 to the input of power amplifier 23. A reference voltage is applied at terminal 21*a* and is coupled via resistor 21*b* to the input of amplifier 23 and the source of retrace gating signals 18 is connected via the diode 18*a* to a common junction point between diodes 18*a* and 28**.

In FIG. 2 the R.C. analog circuit time constant is equal to the *L/R* yoke time constant. When these two time constants are equal, the voltage across the analog capacitor **19*a* is exactly equal to the voltage across the yoke resistive component 25, and the voltage across the analog resistor 19*b* is exactly equal to the voltage across the yoke inductive component 26. This is true without regard to the voltage waveform impressed across the parallel combination of yoke and analog circuit and without regard to the impedance level of the analog network. However, in actual practice it is always desirable to keep the analog circuit impedance relatively high in order to prevent loading of the yoke, particularly during retrace. For best results, the analog resistance 19*b*** should not be less than the inductive reactance of the yoke at the retrace frequency.

In FIG. 2 the analog voltage across resistor **19*b*, the part of waveform A between the retrace pulse components being of primary concern, is converted to an analog current by series resistor 27. The current through resistor 27 is produced by a voltage negative with respect to ground so that diode 28 will be conductive and the input control through the power amplifier 23 will be the combination of a potential from resistor 19*b* and the reference current conducted through resistor 21*b*. If the yoke inductor analog voltage developed across resistor 19*b* is reduced in value, (that is, becomes less negative) the potential at the input to the power amplifier 23 will become more positive since less of the potential at terminal 21*a* will be offset and the power amplifier 23 can provide an increased voltage across the yoke components 25 and 26 to compensate. In a similar fashion, if the yoke inductance analog potential is developed across resistor 19*b* becomes more negative then the power amplifier will provide a compensating decreased voltage across the yoke components 25 and 26**.

The reference current from which the error current is derived determines the voltage across the yoke inductance 26 and also the amplitude of the scan. Therefore, the scan size may be adjusted by varying the reference current, and this has no effect on linearity of the scan within the gain limitation of the amplifier 23. If, however, the supply voltage at **21*a*** changes, the size of the scan will also change. This can be avoided by providing a true constant current reference.

The retrace oscillator 18 which is isolated from the feedback loop including capacitor **19*a* and resistor 27 by the back-biasing of diode 18*a* during active scan of the yoke, provides a negative gating pulse D at the cathode of diode 18*a* to turn off the power amplifier 23 and allow the yoke to retrace. It is necessary to provide a retrace voltage clamp (not shown) as part of the amplifier 23 as shown in FIG. 2 in order to establish a maximum retrace voltage which will be instantaneously applied across the yoke analog circuit. This high positive value of retrace voltage would immediately turn amplifier 23 on again if it were not for the series diode 28** in the analog current leg of the feedback circuit. Thus the analog network is free to follow the yoke voltage throughout the scan and retrace portion of the cycle.

After the yoke has retraced completely, the circuit is restored to active scan by removal of the retrace pulse from retrace gate 10. Retrace can be terminated well before yoke current has completely reversed its direction by narrowing the gate pulse, and this has no effect upon scan size or linearity. However, the D.C. input to the circuit will rise rapidly under these conditions.

The waveforms A and B in FIG. 2 represent the voltage across the resistance and capacitance elements in the yoke analog circuit and waveform C illustrates ramp in the series combination of inductance and resistance components in the yoke. Waveform C includes a retrace pulse portion and a sawtooth or ramp trace portion.

The basic circuit of FIG. 2 is adaptable to a wide variety of specific circuits including choke coupling, transformer coupling, push-pull direct coupling and even RC coupling in low power circuits. Retrace gate 18 can be any free running oscillator capable of supplying a pulse of reasonably constant width.

Figure 3:
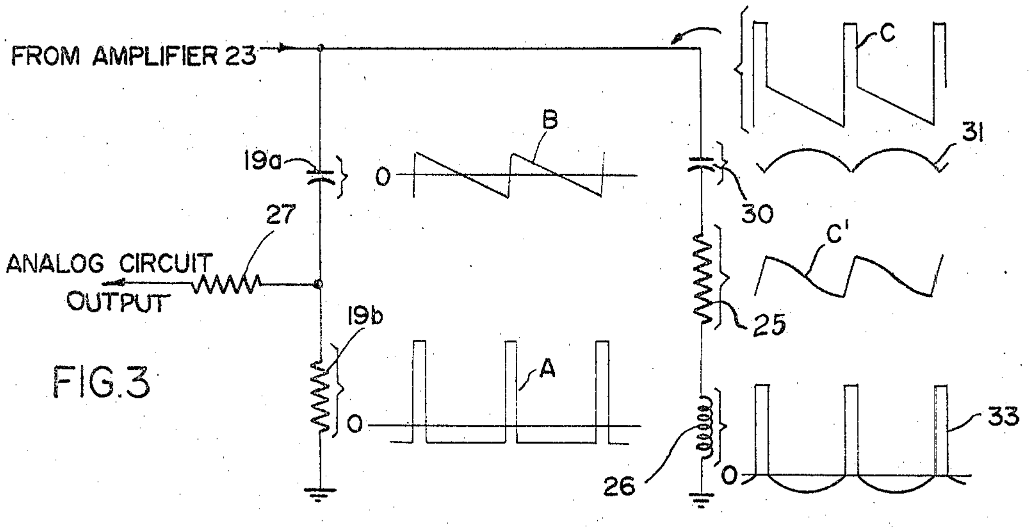
FIG. 3 represents a modification of the embodiment of the invention illustrated in FIG. 2.

The circuit of FIG. 3 is a modification of the circuit in FIG. 2 and the capacitor 30 has been added in the yoke circuit to provide an "S" shaping of the deflection current waveform which is required by a wide angle television cathode ray tube. The analog network does not correct for elements placed in series in the yoke circuit when these are also bridged by the analog RC network 19*a* and 19*b* and the parabolic voltage 31 developed across capacitor 30 modifies the flow of yoke current in a desired direction. This additional capacitance 30 reduces the time rate of change of current flow in the yoke during the initial and final portions of active scan to give the current waveform C′ an "S" shape. This variation in $di/dt$ in the yoke produces a change in voltage across the inductive component of the yoke illustrated by waveform 33.

A more rigorous approach to shaping the yoke current ramp involves an initial definition of the desired yoke waveform and the subsequent selection of capacitor values for the appropriate stored energy at each portion of the scan-retrace cycle. Since this is likely to introduce phase correction requirements, the approach shown in FIG. 4 may be more desirable than adding capacitance in the yoke circuit.

Figure 4:
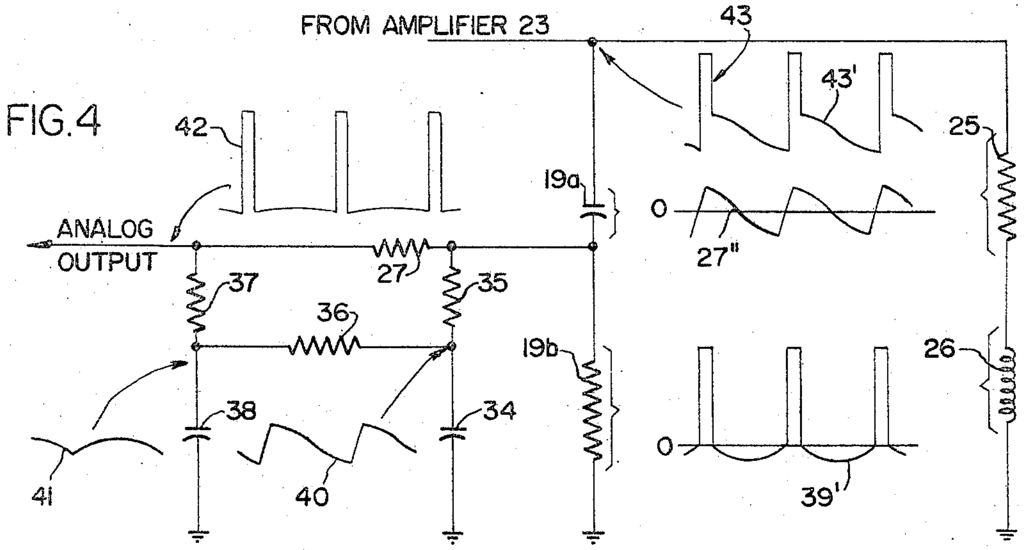
FIG. 4 represents a further modification of the yoke analog deflection system illustrated in FIG 2.

The double integration system of FIG. 4 automatically produces the desired "S" shaping of the waveform supplied from the amplifier 23. The yoke inductance analog voltage 39′ across the analog resistor 19*b* is converted to a sawtooth wave 40 by first integrator consisting of resistor 35 and capacitor 34. This sawtooth wave is in turn converted to a parabolic waveform 41 by a second integrator consisting of resistor 36 and capacitor 38. The parabolic waveform 41 at the junction of resistors 36 and 37 is mixed with the wave 39′ direct from the yoke analog circuit in any desired proportion. The resultant waveform 42 is then applied to the error amplifier and the remaining details of the circuit operation are as in the purely linear case. This approach has the advantage of providing any desired amount of "S" shaping without phasing problems in the yoke circuit. The amplifier output waveform 43 for the circuit of FIG. 4 has an "S" shaped current ramp 43′ similar to the "S" shaped ramp C′ shown in FIG. 3.

The resistive component 25 shifts considerably with temperature and this may be compensated for by making all or part of the analog resistance 19*b* a negative temperature coefficient thermistor which is subjected to the same temperature fluctuations as the yoke.

Figure 5:
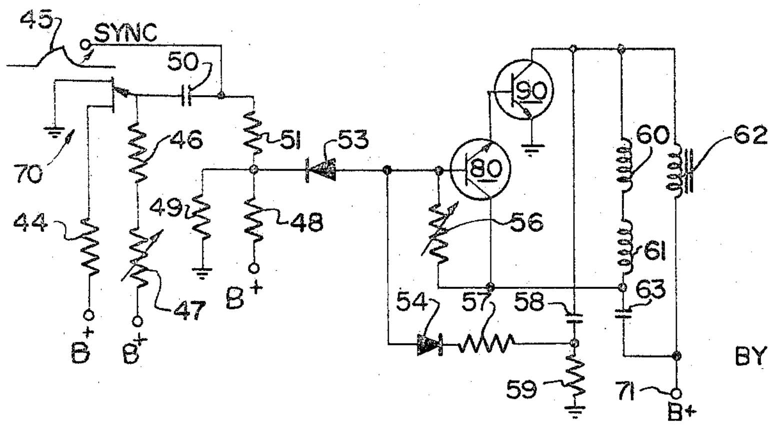
FIG. 5 illustrates another embodiment of the invention employing the yoke analog circuit illustrated in FIG. 2 and including transistorized oscillator, gating, and clamping circuitry.

The circuit of FIG. 5 illustrates a practical example of a transistorized vertical deflection circuit employing the yoke analog system generally described with reference to FIG. 3. Retrace gating for the circuit of FIG. 5 is provided by a unijunction transistor oscillator including unijunction transistor 70, the emitter of which is coupled through a capacitor 50 to a source of sync pulses 45 for gating the oscillator circuit into conduction. The output of the oscillator is taken from the junction of voltage divider resistors 49 and 51. The values of resistors 44, 46 and 47 in the unijunction oscillator circuit are selected to provide a reverse bias on transistor 70 in order to prevent oscillation of the unijunction transistor oscillator prior to the application of a sync pulse 45. The component values listed in Table I below were chosen to provide an oscillator circuit having good frequency stability for relatively large variations in temperature and supply voltage.

The negative output pulses from the oscillator are passed by diode 53 and coupled to the base of NPN transistor error amplifier 80. Amplifier 80 is forward biased via the application of the 40 volt DC supply voltage through output choke 62.

A clamping transistor 90, also an NPN device, is connected to the emitter of transistor 80 and, together with transistor 80, provides a conductive path for current flowing in the vertical yoke deflection coils 60 and 61. The collector output of NPN transistor 90 is connected to one end of the yoke coil 61 and to one end of the yoke analog circuit including capacitor 58 analog resistor 59. Capacitor 63 is connected between the lower end of deflection coil 61 and the positive terminal of a 40 volt DC supply in order to provide the "S" shaping of the deflection current waveform as described with reference to FIG. 3.

A series resistor 57 is connected to the analog circuit in a manner similar to that described in FIGS. 2, 3 and 4, and a diode 54 is connected to the input of error amplifier 80 so that the retrace voltage of the yoke will be decoupled from the base of transistor 80 and prevented from turning on 80 when the yoke retraces.

When a sync pulse is applied as shown in FIG. 5 and turns on the unijunction transistor oscillator, capacitor 50 begins to rapidly charge through transistor 70. Capacitor 50 continues to charge until its reaches a value sufficiently high to turn off 70, at which time it will discharge through resistors 49 and 51. The time constant of capacitor 50 and resistors 49 and 51 establishes a discharge time for the unijunction transistor relaxation oscillator, and using the component values listed in Table I below a narrow output pulse width of approximately 500 microseconds can be obtained. Noise immunity is provided by the large ramp voltage developed across capacitor 50 and the negative output is divided down by resistors 51 and 49 to avoid breakdown of the emitter-base junction of transistor 80. The negative output pulse at the junction of resistors 49 and 51 forward biases diode 53 and turns off transistor 80. When transistor 80 is switched off, transistor 90 is switched into an open base condition.

The current flowing in the yoke is sharply reduced as the transistors 80 and 90 are driven to cutoff, and there is a large self-induced retrace voltage, $$L\frac{di}{dt}$$

in the yoke circuit due to this sharp reduction in yoke current. This induced voltage is initially in the order of thousands of volts since the value $$L\frac{di}{dt}$$

is a finite value. However, this self-induced retrace voltage is clamped at the collection-to-emitter breakdown voltage of transistor 90 with the base open. A 250 volt breakdown voltage for transistor 90 provides a retrace time of approximately 500 microseconds.

Upon retrace of the yoke and clamping of transistor 90, a pulse of approximately 300 volts is applied across resistor 59 for approximately 500 microseconds. The reference voltage for the error amplifier 80 in FIG. 5 is the 40 volt DC source connected at terminal 71. This voltage is applied through the inductive path 62, 61 and 60 to the collector and base electrodes of transistor 80 to bias transistor 80 into conduction in the absence of a negative pulse output from the unijunction oscillator. The resistors 56 are comparable to reference current resistor 21*b* in FIG. 2. The analog voltage across resistor 59 is converted to an analog current by resistor 57 and this current is compared to the reference current through resistor 55 and the variable scan size resistor 57. This comparison produces an error current which flows into the base of error transistor 80 and either increases or decreases the yoke current to compensate for changes in yoke voltage. The path including transistors 80 and 90, capacitor 58 and resistor 57 is stable at all frequencies.

The following table gives the component values for the circuit parameters of a circuit identical to FIG. 5 which operates as above described. However, it should be understood that the invention is in no way limited by the particular values given in Table I.

*Table I*

| | |
|---|---|
| Transistor **70** | Motorola 2N3480. |
| Transistor **80** | Motorola MPS–6512. |
| Transistor **90** | Motorola MJ3010. |
| Diode **53** | Motorola MR2064. |
| Diode **54** | Motorola MR2067. |
| Resistor **44** | 1 kilohm. |
| Resistor **46** | 47 kilohms. |
| Resistor **47** | 100 kilohms. |
| Resistor **48** | 18 kilohms. |
| Resistor **49** | 330 ohms. |
| Capacitor **50** | 0.2 microfarad. |
| Resistor **51** | 1,000 ohms. |
| Resistor **55** | 18 kilohms. |
| Resistor **56** | 100 kilohms. |
| Resistor **57** | 18 kilohms. |
| Capacitor **58** | .51 microfarad. |
| Resistor **59** | 4,300 ohms. |
| Inductance **60, 61** | 620 millihenries, 280 ohms. |
| Inductance **62** | 3.0 henries, 70 ohms. |
| Capacitor **63** | 100 microfarads, 10 volts DC. |

Assuming adequate loop gain is provided by transistors 80 and 90, the scan linearity for the vertical deflection system of the invention depends only upon the precision of the yoke time constant and the time constant of the analog capacitor and the analog resistor. No linearity control is required and this scan size control may be easily adjusted by adjusting variable resistor 56 in the circuit of FIG. 5.

The linearity of all active and passive devices in the circuits described above can be largely ignored provided that the worst combination of all losses does not bring the analog circuit feedback loop gain below an acceptable level.

The oscillator which generates the retrace gating signal has no effect on the scan waveform and it is isolated from any horizontal pulses picked up on the vertical yoke windings.

Compensation for changes in the yoke resistance with temperature is lossless when a thermistor is used as an analog resistor as described above. This simple procedure enables the yoke analog circuit to automatically correct scan size and linearity changes with temperature.

The system of the invention is adaptable to all the usual forms of output circuitry, but the loop gain requirement may necessitate the use of an additional low level gain stage in the circuits described above. However, the cost of a single low level transistor would be very nominal compared to other potential savings provided by the above described invention.

Obviously many modifications may be made in the above described embodiments of the invention without departing from the spirit and scope thereof. Therefore, it should be understood that the invetnion is limited only by way of the following appended claims.

I claim:

1. A deflection system for achieving a predetermined scan and adapted to be used in television circuits including in combination:

(a) a magnetic deflection yoke having series inductance and resistance components therein, (b) a yoke analog circuit having series connected resistance and capacitance components therein and connected in parallel with said deflection yoke, said yoke analog circuit having a time constant equal to the time constant of said deflection yoke, (c) means connected to said deflection yoke for applying a voltage thereto sufficient to produce a current ramp through said yoke during active scan, (d) comparing means connected to said yoke analog circuit and responsive to changes in voltage across the resistance component in said yoke analog circuit for producing an error signal, (e) amplifying means connected between said comparing means and said yoke for applying an amplified error signal to said yoke to compensate for nonlinearities in the current ramp in said yoke, and (f) integrator circuit means connected to said yoke analog circuit for integrating the voltage across the resistance component of the yoke analog circuit to thereby provide a non-linear current ramp in said yoke during active scan thereof.

2. The circuit according to claim 1 wherein said integrator circuit means includes:

(a) a pair of RC integrator networks connected to the output of said yoke analog circuit and in parallel with the signal path from said yoke analog circuit to said comparing means, said pair of integrator networks providing double integration of the voltage developed across said resistance component of said yoke analog circuit to thereby produce a parabolic voltage, and (b) means for mixing said parabolic voltage with said voltage produced across said resistance component of said yoke analog circuit and applying the mixed voltage to said comparing means.

3. The deflection system defined in claim 1 wherein said comparing means includes:

(a) an analog resistor connected to said resistance component of said yoke analog circuit for producing an analog current in response to the analog voltage developed across said resistance component of said yoke analog circuit, (b) a further resistor connected between a reference voltage terminal and the input of said amplifier for developing a reference current to be compared with said analog current, and (c) unidirectional conducting means connected between said further resistor and said analog resistor and conducting current to said yoke analog circuit thereby developing an error signal at said amplifier proportional to the voltage variation across the resistance component of said yoke analog circuit.

4. A vertical deflection circuit comprising:

(a) a magnetic deflection yoke having resistance and inductance components therein, (b) means connected to said deflection yoke for creating a current ramp therein, (c) means connected to said deflection yoke for clamping said retrace voltage at a predetermined maximum value, (d) yoke analog circuit means including series connected resistance and capacitance components connected to said yoke and to said clamping means, said yoke analog circuit means having a time constant equal to the time constant of said deflection yoke, said resistance component in said yoke analog circuit means developing a voltage thereacross equal to the voltage across said inductance component of said deflection yoke, (e) amplifier means connected between said yoke analog circuit means and said clamping means and amplifying an error signal proportional to the analog voltage developed across said resistance component in said yoke analog circuit to thereby increase or decrease the yoke current and compensate for changes in yoke voltage, (f) oscillator means coupled to said amplifier means for driving said amplifier means to cutoff, said oscillator means operable to produce a substantially rectangular pulse output, and (g) undirectional conducting means connected between the output of said oscillator means and the input of said amplifier means for passing gating pulses to said amplifier means.

5. The system defined in claim 4 which further includes:

(a) an analog resistor connected to said resistance component of said yoke analog circuit and developing an analog current having a magnitude proportional to the analog voltage developed across said resistance component in said yoke analog circuit, (b) a further resistor connected between a voltage supply terminal and the input of said amplifier means for developing therethrough a reference current, (c) unidirectional conducting means connected between said further resistor and said analog resistor and conducting current to said yoke analog circuit proportional to voltage variations across said resistance component of said yoke analog circuit, (d) the error current difference between said reference current and said analog current being amplified by said amplifier means and coupled to said deflection yoke to compensate for changes in yoke current that in turn produce changes in analog voltage across the resistance component of said yoke analog circuit.

6. The circuit according to claim 4 wherein:

(a) said oscillator means is a unijunction transistor oscillator having a short relaxation time for producing a narrow pulse output.

(b) means for triggering said oscillator for changing the conductive state thereof, (c) said unidirectional conducting means including a diode connected between the output of said unijunction transistor oscillator and the input of said amplifier means for passing pulses to said amplifier means for driving said amplifier means to cutoff, and (d) said amplifier means and said clamping means including series connected like conductivity transistors connected between said diode and said yoke and being driven to cutoff upon receipt of pulses from said oscillator.

7. The circuit according to claim 4 wherein:

(a) said unidirectional conducting means is a diode connected between the output of said oscillator means and the input of said amplifier means for passing unidirectional pulses to said amplifier means for driving amplifier means to cutoff, (b) said amplifier means consisting of a transistor having input, output and control electrodes, said control electrode connected to said diode for receiving pulses from said oscillator means, (c) said clamping means including a transistor having input, output and control electrodes and connected between the output electrode of said amplifying means and said yoke, (d) said clamping means having a predetermined breakdown voltage for limiting the retrace voltage of said yoke, and (e) a second diode means connected between said yoke analog circuit means and said amplifier means for preventing the retrace voltage of said yoke from turning on said amplifier means during retrace of said yoke.

References Cited

UNITED STATES PATENTS

| | | | |
|---|---|---|---|
| 2,799,800 | 7/1957 | Starks-Field et al. | 315—27 |
| 2,890,382 | 6/1959 | Baldwin | 315—27 |
| 3,349,279 | 10/1967 | Schafft | 315—27 |

RODNEY D. BENNETT, *Primary Examiner.*

C. L. WHITHAM, *Assistant Examiner.*